United States Patent [19]
Dishart et al.

[11] Patent Number: 5,596,335
[45] Date of Patent: Jan. 21, 1997

[54] ELECTRICAL CONNECTOR

[75] Inventors: Peter T. Dishart, Pittsburgh; Frank J. Pazul, Lower Burrell, both of Pa.

[73] Assignee: PPG Industries, Inc., Pittsburgh, Pa.

[21] Appl. No.: 364,371

[22] Filed: Dec. 27, 1994

[51] Int. Cl.$^6$ .................................................. H01Q 1/32
[52] U.S. Cl. .................................................. 343/713
[58] Field of Search .............................. 439/894, 77, 34, 439/495; 343/713, 704

[56] References Cited

U.S. PATENT DOCUMENTS

| | | | |
|---|---|---|---|
| 4,768,037 | 8/1988 | Inaba et al. | 343/713 |
| 4,849,766 | 7/1989 | Inaba et al. | 343/713 |
| 4,869,670 | 9/1989 | Ueda et al. | 439/77 |
| 4,934,946 | 6/1990 | Ordway | 439/77 |
| 5,083,135 | 1/1992 | Nagy et al. | 343/713 |
| 5,208,444 | 5/1993 | Winter | 219/547 |
| 5,307,076 | 4/1994 | Murakami | 343/704 |
| 5,355,144 | 10/1994 | Walton et al. | 343/713 |
| 5,416,491 | 5/1995 | Nishikawa et al. | 343/713 |

FOREIGN PATENT DOCUMENTS

| | | | |
|---|---|---|---|
| 0047103 | 4/1981 | Japan | 343/704 |
| 57-148405 | 9/1982 | Japan | 343/704 |

*Primary Examiner*—Neil Abrams
*Attorney, Agent, or Firm*—Andrew C. Siminerio

[57] ABSTRACT

The present invention provides a connector for interconnecting electroconductive elements within a laminate. The connector includes a flat electroconductive member having a first portion with at least one connecting segment which overlays an electroconductive element within the laminate, and a second portion extending from the first portion. One end of the second portion of the connector includes a rigid, integral connection terminal which includes multiple plies of the member. Selected portions of the first portion, and preferably at least the connecting segment, are coated with an adhesive. The adhesive may be electrically conductive or non-electrically conductive. In one particular embodiment of the invention the maximum thickness of the first portion of the connector is about 0.10 mm and the maximum width of the first portion, other than the connection segment, is about 6.4 mm. An electrically insulating cover may be positioned over a section of the second portion and a sealing means positioned along the member between the first and second portions. In another embodiment the connector may be positioned in spaced apart relationship to the electroconductive elements to provide a capacitive relationship between the connector and the element.

22 Claims, 1 Drawing Sheet

ELECTRICAL CONNECTOR

BACKGROUND OF THE INVENTION

The present invention relates to an electrical connector and in particular, to a connector for use in connecting electroconductive elements within a laminated glass assembly to an externally located device.

Recently, automotive stylists and engineers have begun to incorporate additional features into the windows of motor vehicles. For example, bus bars and electroconductive coatings have been incorporated into a vehicle windshield as disclosed in U.S. Pat. No. 5,208,444 to Winter et al., to heat the windshield to remove fog and ice on its surface. More recently, antennas have been incorporated into the window glass of the vehicle. For example, U.S. Pat. Nos. 4,768,037 and 4,849,766 to Inaba et al. use a transparent, electroconductive coating over a substantial portion of a window, and in particular a vehicle windshield, to form an antenna. U.S. Pat. No. 5,083,135 to Nagy et al. utilizes a transparent, electroconductive coating in the shape of a "T" to form an antenna.

In order to make electrical contact with these electroconductive elements and to connect them to an external device, e.g. a power source or radio, connectors are used. Clips may be soldered directly to exposed portions of the elements. As an alternative, wires, braids or metal tabs may be secured to the electrical components and laminated within in the glass structure. These connectors generally require an additional element be added to the end of the connector to make electrical connection to a lead from the external device.

It has been found that when incorporating these latter types of connectors into the laminate, there are processing concerns. In particular, air may be entrapped in the laminate in the vicinity of the connector during assembly due to the configuration of the connector, and in particular, its thickness. This in turn may result in the formation of air bubbles in the vicinity of the connector during some portion of the laminate's useful life. These bubbles detract from the aesthetics of the window as well as increase the possibility of delamination of the laminate at or near the connector.

It would be advantageous to provide a connector that may be incorporated within a laminate to electrically interconnect electrical components while minimizing any adverse effect the connector may have during the processing or subsequent use of the laminate. It would also be advantageous to provide a connector with a rigid, integral connecting portion to connect the electrical components with other devices in the vehicle.

SUMMARY OF THE INVENTION

The present invention provides a connector for interconnecting electroconductive elements within a laminate. The connector includes an electroconductive member having a first portion with at least one connecting segment which overlays an electroconductive element within the laminate, and a second portion extending from the first portion. One end of the second portion of the connector includes a rigid, integral connection terminal which includes multiple plies of the member. Selected portions of the first portion, and preferably at least the connecting segment, are coated with an adhesive. The adhesive may be electrically conductive or non-electrically conductive. In one particular embodiment of the invention, first portion of the member has a thickness of up to 0.10 mm, the adhesive has a thickness of up to 0.05 mm, and the total combined thickness of the connector along any part of the first portion is up to 0.10 mm. The maximum width of the first portion, other than the connection segment, is about 6.4 min. The connector further includes an electrically insulating cover positioned over a section of the second portion and a sealing means positioned along the member between the first and second portions.

DETAILED DESCRIPTION OF THE INVENTION

Figure 1:
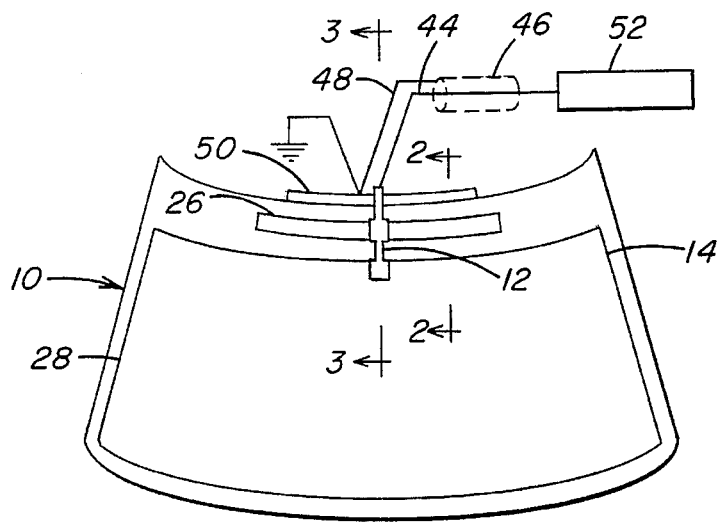
FIG. 1 is a plan view of a transparent glass antenna incorporating features of the present invention.

FIG. 1 illustrates a laminate 10 having a connector 12, which is the object of the present invention, laminated within and electrically connected to at least one electroconductive element 14 within the laminate 10. For illustrative purposes, the connector 12 will be shown in combination with a vehicle windshield which incorporates a transparent antenna within the windshield. However, it should be appreciated that the connector 12 as taught herein may be used in any type of laminated assembly where it is required to make an electrical connection to one or more electroconductive elements within a laminate. The windshield 10 is formed by outer and inner glass plies 20 and 22 bonded together by a plastic interlayer 24, preferably polyvinylbutyral, to form a unitary structure. If desired, plies 20 and 22 may be other transparent, rigid material, e.g. polycarbonate. Windshield 10 further includes two electroconductive elements; a first antenna element 26 spaced from a second antenna element 28. In the particular embodiment illustrated in FIG. 1, element 28 extends along an upper portion of windshield 10 and element 26 is positioned below element 28 and generally occupies the central portion of ply 20 which comprises a major portion of the vision area of the laminate 10. The elements 26 and 28 are preferably transparent electroconductive coatings applied on surface 30 of glass ply 20 (as shown in FIG. 1) or on surface 32 of ply 22, in any manner well known in the art. It should be appreciated that depending on the additional functions to be incorporated into the laminate 10, the laminate may have as few as one electroconductive element, e.g. as disclosed in U.S. Pat. No. 4,849,766 to Inaba et al., or a number of elements, e.g. as disclosed in U.S. Pat. No. 5,208,444.

Referring to FIGS. 1–4, connector 12 includes a flat, electroconductive member 34 with portions that overlay and connect to selected electroconductive elements within the laminate 10 and further includes an integral terminal to connect to an external device, e.g. a power source or a radio wave receiver/transmitter. In the particular use of the present invention illustrated in FIG. 1, lower portion 36 of connector 12 overlays a portion of lower element 28 and a central portion 38 of connector 12 overlays a portion of upper element 26. Upper portion 40 of connector 12 extends outwards from the peripheral edge 42 of the windshield 10 to provide means to electrically connect the antenna to a connector for a radio wave receiving and/or transmitting device. More particularly, portion 40 extends outward of the windshield 10 and is connected to the inner conductor 44 of a coaxial cable 46. The outer conductor or shield 48 of the cable 46 is electrically connected to a ground point on the vehicle body, and more particularly, to the metal frame 50 (a portion shown in FIG. 1 only) of the vehicle surrounding the windshield 10. The cable 46 electrically connects the elements 26 and 28 to a radio wave receiver and/or transmitter 52.

Member 34 of conductor 12 is preferably fabricated from a flat metal sheet such as stainless steel, copper, tin or any other electroconductive material. If required, combinations of materials such as stainless steel coated with copper, tin or silver may be used to enhance conductivity and strength. In addition, the connector may also be formed from a metal mesh or electroconductive plastic.

The connection between the connector 12 and lead from the external device may be a soldered, glued or clip-on type connection. It is preferred that the effective thickness of end 54 of portion 40 of connector 12 be increased to provide a rigid, integral connection terminal and thus make it easier to make the required connection. For example, additional material may be adhered to the end 54, or end 54 may be folded to increase the number of plies of material at the terminal. In addition, the folded end may be crimped to further increase the effective thickness and rigidity of the terminal at end 54 of the connector 12. In one particular embodiment of the invention, the end 54 is folded and crimped to form a spade-type connection that is readily receivable by a mating connection device of a type well known in the art.

Member 34 of connector 12 is secured either directly or capacitively to the electroconductive elements 14 within the laminate 10. More particularly, referring to FIG. 3, connector 12 may include an adhesive 56 which is applied at least to those portions of surface 58 of member 34 which overlay the elements 14. The adhesive 56 may be electrically conductive to provide a direct electrical connection between elements 14 and connector member 34 or it may be nonconductive so that the electrical connection between elements 14 and member 34 is capacitive. With respect to incorporating the connector 12 within a windshield to provide connection to a transparent glass antenna as shown in FIG. 1, it has been found that a capacitive connection may be used to produce a capacitive reactance that matches the inductive reactance of the antenna to the coaxial cable by minimizing the net reactive component as disclosed in U.S. Pat. No. 5,365,146 to Walton, et al. The size and shape of the overlaying portions of connector 12, and more particularly the size and shape of lower portion 36 and central portion 38 of the particular connector 12 illustrated in FIGS. 1–4, may be adjusted, if required, based in part on the spacing between member 34 and elements 14, the type of materials used for the elements 14, member 34 and adhesive 56, and the desired electrical characteristic, to provide the proper match. Although the shape of portions 36 and 38 is rectangular, it should be appreciated that these enlarged portion of connector 12 may be any required shape necessary to effect the desired connection. It should further be appreciated that with a direct connection between member 34 and elements 14, the width of connector 12 may not have to be increased to provide the required electrical connection.

Figure 2:
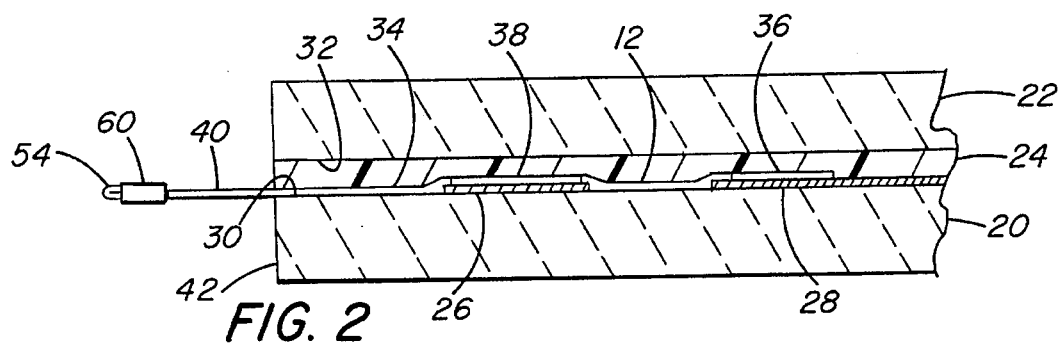
FIG. 2 is a sectional view taken along line 2—2 in FIG. 1, with portions removed for clarity.

Although FIG. 2 shows the connector 12 positioned along the same surface of the substrate as the electroconductive elements 14, i.e. surface 30 of ply 20 so that the adhesive 56 is between member 34 and elements 14, it should be appreciated that connector 12 may also be positioned internally within windshield 10 along surface 32 of ply 22, and if desired, secured to surface 32. Since such an arrangement inherently provides a capacitive connection between elements 14 and member 34 due to the interlayer 24 being disposed between elements 14 and connector 12, the portion of connector 12 which overlays the elements 14 may be increased to provide the required electrical characteristic. For example, referring to the embodiment of the invention shown in FIGS. 1 and 2, the width of connector 12 at lower portions 36 and 38 which overlay elements 28 and 26, respectively, may be increased.

The thickness of member 34 and adhesive 56 of connector 12 within the laminate 10 should be kept to a minimum to minimize the potential of air bubbles forming at or near the connector 12 resulting from the assembly and laminating operations, which are well known in the art. The bubbles may adversely affect the strength of the laminate at the connection and detract from the laminate's appearance. It has been determined that when using conventional roll pressing and laminating techniques which are well known in the art, it is preferred that the total thickness of the connector 12, i.e. member 34 and adhesive 56, should not exceed 0.004 inches (0.10 mm) to minimize the formation of bubbles within the laminate 10. Member 34 of connector 12 is preferably made from stainless steel with a constant thickness ranging from 0.0005 to 0.002 inches (0.013 to 0.05 mm), although the thinner connectors are flimsy and more difficult to handle than the thicker connectors. The adhesive 56 is applied as a double faced tape, an adhesive spray, or any other type of adhesive system well known in the art, at a thickness preferably ranging from 0.001 to 0.002 inches (0.025 to 0.05 mm). It was observed that at thinner amounts, the adhesive did not make good optical contact with the glass surface, i.e. defects in the adhesive were visible through the glass substrate, although it is believed that such defects do not effect the electrical performance of the connection.

It is contemplated that in one embodiment of the present invention that connector 12 not incorporate an adhesive to secure the connector to a surface within the laminate 10. More particularly, member 34 without any adhesive may be positioned on substrate and covered with an interlayer which holds the connector in place and secures it within the laminate after the lamination process. It should be noted that if the adhesive 56 along member 34 is eliminated, the thickness of member 34 may be increased up to 0.004 inches (0.10 mm).

In order to minimize the visual appearance of the connector 12 through the glass, the width of the connector 12 should also be kept at a minimum, although as discussed earlier, the width of selected portions of connector 12 may be increased to provide the necessary electrical connection to electroconductive elements 14. However, the width must also be sufficient to provide the connector 12 with the required conductivity. More particularly, if the cross-sectional area of the connector 12 is too small, the resistive loss will not allow the desired current flow to pass between the external device and the electroconductive elements 14 through the connector 12. Connectors 12 have been made with a width ranging from 0.10 to 0.25 inches (2.5 to 6.4 mm), although the thinner connectors are flimsy and more difficult to handle than the thicker connectors. To further hide the connector 12, it may be processed or coated to provide a less noticeable colored surface, e.g. black. In addition, if desired, portion 40 of connector 12 may be widened as it exits the laminate 10 to increase the strength of the connector 12 outside the laminate and make it easier to make a connection to an external device.

Figure 3:
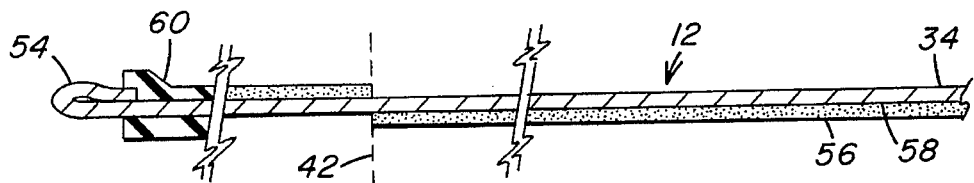
FIG. 3 is a sectional view taken along line 3—3 of FIG. 1, with portions removed for clarity.
Figure 4:
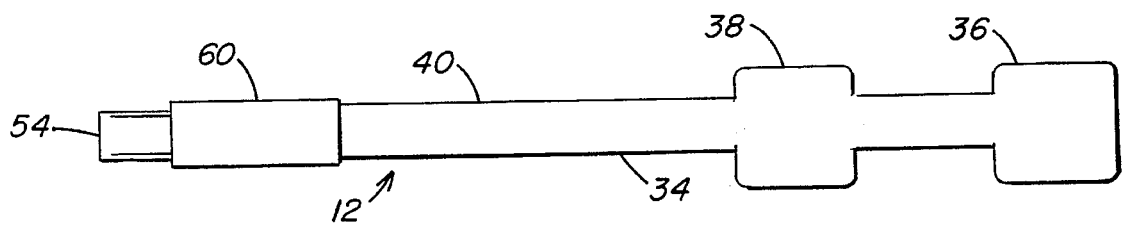
FIG. 4 is an enlarged plan view of one particular embodiment of the electrical connector incorporating features of the present invention.

In one particular embodiment of the invention, member 34 of connector 12 is a flat, stainless steel substrate approximately 0.0015 in. (0.038 mm) thick and generally 0.25 in. (6.4 mm) wide. The width of the lower portion 36 and central portion 38 is increased to form a connection area of approximately 0.75 in. ×0.75 in. (19 mm×19 mm) to improve the connection between member 34 and elements 28 and 26, respectively, and provide the required connection characteristics. The adhesive 56 is a double sided electrically non-conductive adhesive, for example as is available from 3M Company, St. Paul, Minn. adhesive product no. 9482, approximately 0.002 in. (0.05 mm) thick so that the total uninstalled thickness of this particular connector is approximately 0.0035 in. (0.088 mm). As an alternative, an electrically conductive adhesive, e.g. 3M Company product no. 9703, may be used to secure corresponding portions of member 34 of connector 12 to elements 14. Although not required, connector 12 may include adhesive along the entire surface of member 34 that is positioned within the windshield 10 as shown in FIG. 3. In addition, if desired, connector 12 may include an adhesive, such as 3M Company product no. 9485, applied along either surface of the section of upper portion 40 which extends outside of the windshield 10 so that this section of the connector 12 may be secured to either of the outwardly facing major surfaces of the windshield 10 during processing and/or hold the connector 12 in place after it has been electrically connected to a lead from the external device. End 48 of connector 12 is folded to double its thickness and crimped to form a spade-type connection terminal which is received within a mating contact from the lead of an external device. In addition, in one particular embodiment, selected sections of portion 40, including portions of the connection terminal, are covered, e.g. by a shrink wrap 60, to electrically insulate the connector 12 and prevent it from contacting anything metal when the laminate is installed in a vehicle and causing the electrical components within the windshield 10 to malfunction. If desired, the shrink wrap 60 may extend the length of portion 40, i.e. from terminal end 48 to the edge of the laminate 10, and further the shrink wrap 60 may be coated with an adhesive to secure this portion of connector 12 along the laminate. In one particular embodiment of the invention where end 48 is folded to form an integral terminal, the shrink wrap covers a portion of the terminal to assist in holding the multiple plies forming the terminal together.

It is preferred that connector 12 include a sealant along at least to that section of portion 40 where it exits the laminate 10, as shown in FIG. 3 to seal the connector 12 within the laminate 10 and prevents ingress of moisture into the assembly at the connector 12. In one particular embodiment of the invention, the sealant is an adhesive, e.g. of the type discussed earlier, which is applied to the surface of the connector member 34 which is secured to glass surface 30. This adhesive in combination with the interlayer 24 seals member 34 within the laminate 10 and prevents ingress of moisture into the assembly at the connector 12.

Although the connector configuration disclosed herein illustrates connection to an arrangement of two spaced apart antenna elements, it is contemplated that other connector configurations may be produced using the teachings of the present invention. More particularly, it is contemplated that the connector 12 may be used to electrically interconnect with one or more electroconductive elements within a laminate and if required, include one or more enlarged connection areas to make the required electrical connection to elements 14.

The present invention provides a connector that is secured within a laminated structure to electrically interconnect electroconductive elements within the laminate. The connector also provides an integral terminal arrangement for connecting to a lead from an external device. The connector is also configured to minimize the formation of bubbles within the laminate in the vicinity of the connector as a result of the laminating operation.

The invention described and illustrated herein represents a description of illustrative preferred embodiments thereof. It is understood that various changes may be made without departing from the gist of the invention defined in the claims set to follow.

We claim:

1. A connector for interconnecting multiple electroconductive antenna elements within a laminate, comprising:

a flat, electroconductive member having a first portion which overlays a first electroconductive transparent antenna element within a laminate, a second portion which overlays a second electroconductive transparent antenna element within said laminate, a third portion electrically interconnecting said first and second portions, and a fourth portion extending from said second portion; and an integral connection terminal at one end of said fourth portion, wherein said terminal is formed from multiple plies of said fourth portion of said member.

2. The connector as in claim 1 wherein said first, second and third portions of said member have a thickness of up to about 0.10 mm.

3. The connector as in claim 1 wherein selected portions of said member are coated with an adhesive.

4. The connector as in claim 3 wherein said selected portions include at least said first, second and third portions of said member.

5. The connector as in claim 4 wherein said adhesive is an electrically conductive adhesive.

6. The connector as in claim 4 wherein said adhesive is a non-electrically conductive adhesive.

7. The connector as in claim 4 wherein said adhesive has a thickness of up to 0.05 mm, and said first, second and third portions of said member each have a total thickness of up to 0.10 mm.

8. The connector as in claim 4 wherein said third portion of said member has a maximum width of about 6.4 mm.

9. The connector as in claim 4 further including an electrically insulating cover positioned over a section of said fourth portion of said member.

10. The connector as in claim 9 wherein said cover extends over at least a portion of said terminal.

11. The connector as in claim 4 wherein said first and second portions of said member have a first predetermined width and said third portion have a second predetermined width less than said first predetermined width.

12. The connector as in claim 11 wherein said second width does not exceed about 6.4 mm.

13. The connector as in claim 4 further including sealing means positioned along said fourth portion of said member.

14. A connector for interconnecting multiple electroconductive antenna elements within a laminated vehicle transparency, comprising:

a flat, electroconductive member having a first portion which overlays a first electroconductive transparent antenna element within a laminate, a second portion which overlays a second electroconductive transparent antenna element within said laminate, a third portion electrically interconnecting said first and second portions, and a fourth portion extending from said second portion, wherein said first and second portions of said member have a first predetermined width and said third portion has a second predetermined width less than said first predetermined width;

adhesive covering at least selected portions of said first, second and third portions of said member, wherein said adhesive covered selected portions each have a total thickness of up to 0.10 mm; and an integral connection terminal formed at one end of said fourth portion from multiple plies of said fourth portion of said member.

15. The connector as in claim 14 wherein said adhesive covering said selected portions of said first and second portions of said members is an electrically conductive adhesive.

16. The connector as in claim 14 wherein said adhesive covering said selected portions of said first and second portions of said members is a non-electrically conductive adhesive.

17. The connector as in claim 14 further including sealing means positioned along selected portions of said fourth portion of said member.

18. The connector as in claim 14 wherein said adhesive has a thickness of up to 0.05 mm.

19. The connector as in claim 18 wherein said third portion has a maximum width of about 6.4 mm.

20. The connector as in claim 14 further including an electrically insulating cover positioned over a section of said fourth portion of said member.

21. The connector as in claim 20 wherein said cover extends over at least a portion of said terminal.

22. A connector for interconnecting multiple electroconductive antenna elements within a laminated vehicle transparency, comprising:

a flat, electroconductive member having a first portion which overlays a first electroconductive transparent antenna element within a laminate, a second portion which overlays a second electroconductive transparent antenna element within said laminate, a third portion electrically interconnecting said first and second portions, and a fourth portion extending from said second portion, wherein said first and second portions of said member have a first predetermined width and said third portion has a second predetermined width less than said first predetermined width;

adhesive covering at least selected portions of said first, second and third portions of said member, wherein said adhesive covered selected portions each have a total thickness of up to 0.10 mm; and an connection terminal at one end of said fourth portion of said member.

* * * * *